(12) United States Patent
Koike

(10) Patent No.: US 8,302,110 B2
(45) Date of Patent: Oct. 30, 2012

(54) METHOD OF CONFIGURATION PROCESSING OF PCI DEVICE ON VIRTUALIZATION APPARATUS AND COMPUTER SYSTEM

(75) Inventor: Takeshi Koike, Tokyo (JP)

(73) Assignee: NEC Corporation, Tokyo (JP)

( * ) Notice: Subject to any disclaimer, the term of this patent is extended or adjusted under 35 U.S.C. 154(b) by 45 days.

(21) Appl. No.: 12/716,541

(22) Filed: Mar. 3, 2010

(65) Prior Publication Data

US 2010/0228887 A1 Sep. 9, 2010

(30) Foreign Application Priority Data

Mar. 5, 2009 (JP) ................................. 2009-051861

(51) Int. Cl.
*G06F 3/00* (2006.01)

(52) U.S. Cl. ............ 719/324; 719/321; 710/9; 710/313; 711/173; 711/203; 713/1; 713/2

(58) Field of Classification Search ........................ None
See application file for complete search history.

(56) References Cited

U.S. PATENT DOCUMENTS

| | | | |
|---|---|---|---|
| 6,330,656 B1* | 12/2001 | Bealkowski et al. | 712/13 |
| 6,594,785 B1* | 7/2003 | Gilbertson et al. | 714/48 |
| 7,024,510 B2* | 4/2006 | Olarig | 710/311 |
| 7,530,071 B2* | 5/2009 | Billau et al. | 718/104 |
| 7,613,847 B2* | 11/2009 | Kjos et al. | 710/22 |
| 7,624,262 B2* | 11/2009 | Diep et al. | 713/2 |
| 7,689,755 B2* | 3/2010 | Balasubramanian et al. | 710/311 |
| 7,743,389 B2* | 6/2010 | Mahalingam et al. | 719/321 |
| 7,774,794 B2* | 8/2010 | Panesar et al. | 719/321 |
| 7,793,307 B2* | 9/2010 | Gokhale et al. | 719/324 |
| 7,877,760 B2* | 1/2011 | Oney et al. | 719/321 |
| 2004/0186942 A1* | 9/2004 | Olarig | 710/313 |
| 2007/0044108 A1* | 2/2007 | Panesar et al. | 719/321 |
| 2007/0283147 A1* | 12/2007 | Fried et al. | 713/167 |
| 2008/0005297 A1* | 1/2008 | Kjos et al. | 709/223 |
| 2008/0155243 A1* | 6/2008 | Diep et al. | 713/2 |

(Continued)

FOREIGN PATENT DOCUMENTS

JP 2002318779 A 10/2002

(Continued)

OTHER PUBLICATIONS

'I/O Virtualization (IOV) for Dummies' by Mallik Mahalingam, VMWare, Inc. 2007.*

(Continued)

*Primary Examiner* — Steven Snyder

(57) ABSTRACT

To simplify the structure and improve the performance of virtualization software. There is provided virtualization unit for capturing a configuration access to a physical device from a virtual CPU, identifying a partition to which the physical device belongs from a device address of the physical device accessed by the virtual CPU, and if the physical device does not belong to the virtual CPU's own partition, replacing a content of a configuration register that identifies the physical device with information on a nonexistent dummy device, and notifying the resultant to the virtual CPU. The physical device not belonging to the virtual CPU's own partition is recognized as a named valid device by using a dummy device driver corresponding to the dummy device. The dummy device driver rejects execution of processing common to all physical devices that is requested by the virtual CPU and disturbs operation of a physical device belonging to another partition.

4 Claims, 10 Drawing Sheets

U.S. PATENT DOCUMENTS

| | | | |
|---|---|---|---|
| 2008/0162865 A1* | 7/2008 | Koufaty et al. | 711/173 |
| 2008/0222338 A1* | 9/2008 | Balasubramanian et al. | 710/306 |
| 2008/0250222 A1* | 10/2008 | Gokhale et al. | 711/203 |
| 2009/0119684 A1* | 5/2009 | Mahalingam et al. | 719/324 |

FOREIGN PATENT DOCUMENTS

| | | |
|---|---|---|
| JP | 2005250975 A | 9/2005 |
| JP | 2008046722 A | 2/2008 |

OTHER PUBLICATIONS

'I/O Architectures for Virtualization' by Mallik Mahalingam, VMWare, Inc., VMWorld 2006.*

'Logical Domains' article from Wikipedia.org.*

* cited by examiner

FIG.7

DEVICE CONTROL TABLE

| SET VALUES IN CONFIG_ADDR | | | | REAL DEVICE | | DUMMY DEVICE | |
|---|---|---|---|---|---|---|---|
| BUS NUMBER | DEVICE NUMBER | FUNCTION NUMBER | PARTITION NUMBER | VENDOR ID | DEVICE ID | VENDOR ID | DEVICE ID |
| 00 | 00 | 00 | 1 | 1014 | 1080 | 5853 | 9999 |
| 00 | 01 | 00 | 0 | 1033 | 1000 | 5853 | 8888 |
| 01 | 00 | 00 | 1 | 8086 | 1008 | 5853 | 9999 |
| 01 | 01 | 00 | 2 | 1014 | 1080 | 5853 | 9999 |
| 01 | 02 | 00 | 2 | 8086 | 1008 | 5853 | 9999 |

METHOD OF CONFIGURATION PROCESSING OF PCI DEVICE ON VIRTUALIZATION APPARATUS AND COMPUTER SYSTEM

The present application claims priority from Japanese Patent Application No. 2009-051861 filed on Mar. 5, 2009, and the disclosure of which is incorporated herein in its entirety by reference.

TECHNICAL FIELD

The present invention relates to a method of configuration processing of a PCI device on a virtualization apparatus, and a computer system.

BACKGROUND ART

Virtualization technologies abstract the association between hardware and software so that software such as an operating system (OS) can operate hardware through abstraction layers, not by direct control.

Virtualization technologies themselves have been around since the days of mainframe dominance. The purpose of such technologies was to run a plurality of basic systems on a single set of hardware so that the expensive hardware could be used more efficiently.

With the advancement of technology and the penetration of open source software, it is now possible to construct virtual environments even on inexpensive servers easily.

As a technology related to the present invention, PTL 1 describes a PCI device in which the address space of a configuration register is defined within the address space of a memory-mapped I/O register. The configuration register is accessed by specifying addresses of the configuration register which are defined within the address space of the memory-mapped I/O register.

PTL 2 describes a computer system that incorporates both PCI and non-PCI devices. A storage area storing at least predetermined identification information on a virtual PCI device associated with a non-PCI device is prepared on the system-BIOS side. The predetermined identification information of the virtual PCI device is stored into a header area of the configuration space of the virtual PCI device on a medium which the system BIOS can refer to.

{Citation List}
{Patent Literature}
{PTL 1} JP-A-2002-318779
{PTL 2} JP-A-2005-250975

SUMMARY OF INVENTION

Technical Problem

The purpose of virtualization has recently shifted from the pursuit of hardware use efficiency to the provision of virtualization infrastructures that are simpler in mechanism and allow long-term use of once developed software resources even with some decrease in use efficiency.

In view of the foregoing evolutions of virtualization technologies, the exemplary object of the present invention is to simplify the structure and improve the performance of virtualization unit.

Solution to Problem

A computer system according to the present invention includes:
 a plurality of physical devises belonging to a plurality of partitions divided by virtualization;
  a plurality of physical CPUs belonging to the plurality of partitions;
  a plurality of standard devise drivers belonging to the plurality of partitions, the plurality of standard devise drivers being used for accessing the plurality of physical devises;
  a plurality of dummy device drivers belonging to the plurality of partitions, the plurality of dummy devise drivers being corresponding to a plurality of nonexistent dummy devices;
  a plurality of virtual CPUs belonging to the plurality of partitions; and
  a virtualization unit for capturing a configuration access to the physical device from the virtual CPU and identifying a partition to which the physical device belongs from a device address of the physical device accessed by the virtual CPU,
   wherein if the accessed physical device belongs to the virtual CPU system's partition, the virtualization unit executes a configuration register read or write to the physical device requested by the virtual CPU, and if the accessed physical device does not belong to the virtual CPU's partition, the virtualization unit replaces a content of a configuration register that identifies the physical device with information on a nonexistent dummy device and notifying the resultant to the virtual CPU, and
   wherein the virtual CPU recognizes the physical device not belonging to its own partition as a named valid device by using the dummy device driver, and the dummy device driver rejects execution of processing that disturbs operation of a physical device belonging to another partition, from execution of processing common to all physical devices that is requested by the virtual CPU.

A method of configuration processing on a PCI device according to the present invention is a method of configuration processing of a physical device on a virtualization apparatus, the method including:
 capturing a configuration access to a physical device from a virtual CPU;
 identifying a partition to which the physical device belongs, from a device address of the physical device accessed by the virtual CPU;
  if the accessed physical device belongs to the virtual CPU's partition, executing a configuration register read or write to the physical device requested by the virtual CPU, and if the accessed physical device does not belong to the virtual CPU's partition, replacing a content of a configuration register that identifies the physical device with information on a nonexistent dummy device and notifying the resultant to the virtual CPU;
  making the virtual CPU recognize the physical device not belonging to its own partition as a named valid device by using a dummy device driver corresponding to the dummy device; and
 rejecting, by using the dummy device driver, execution of processing that disturbs operation of a physical device belonging to another partition, from execution of processing common to all physical devices that is requested by the virtual CPU.

Advantageous Effects of Invention

According to the present invention, when viewed from an OS that runs on the virtualization unit, the register allocation of PCI devices in a virtual memory-mapped I/O space is identical to that in the real memory-mapped I/O space. Therefore, the OS's standard PCI device driver can thus be used as-is, with the effect of reducing the program scale and improving the reusability of the virtualization unit.

The OS can also access the I/O registers of the PCI devices without address translation from the virtual memory-mapped I/O space into the real memory-mapped I/O space. This provides the effect of avoiding a virtualization-based decrease in I/O throughput.

BRIEF DESCRIPTION OF DRAWINGS

FIG. 7 A diagram showing a device management table.

DESCRIPTION OF EMBODIMENT

Hereinafter, an embodiment of the present invention will be described in detail with reference to the drawings.

For easy understanding of the embodiment of the present invention, technologies for I/O virtualization will initially be described. The technologies for I/O virtualization include paravirtualization and full virtualization.

Figure 2:
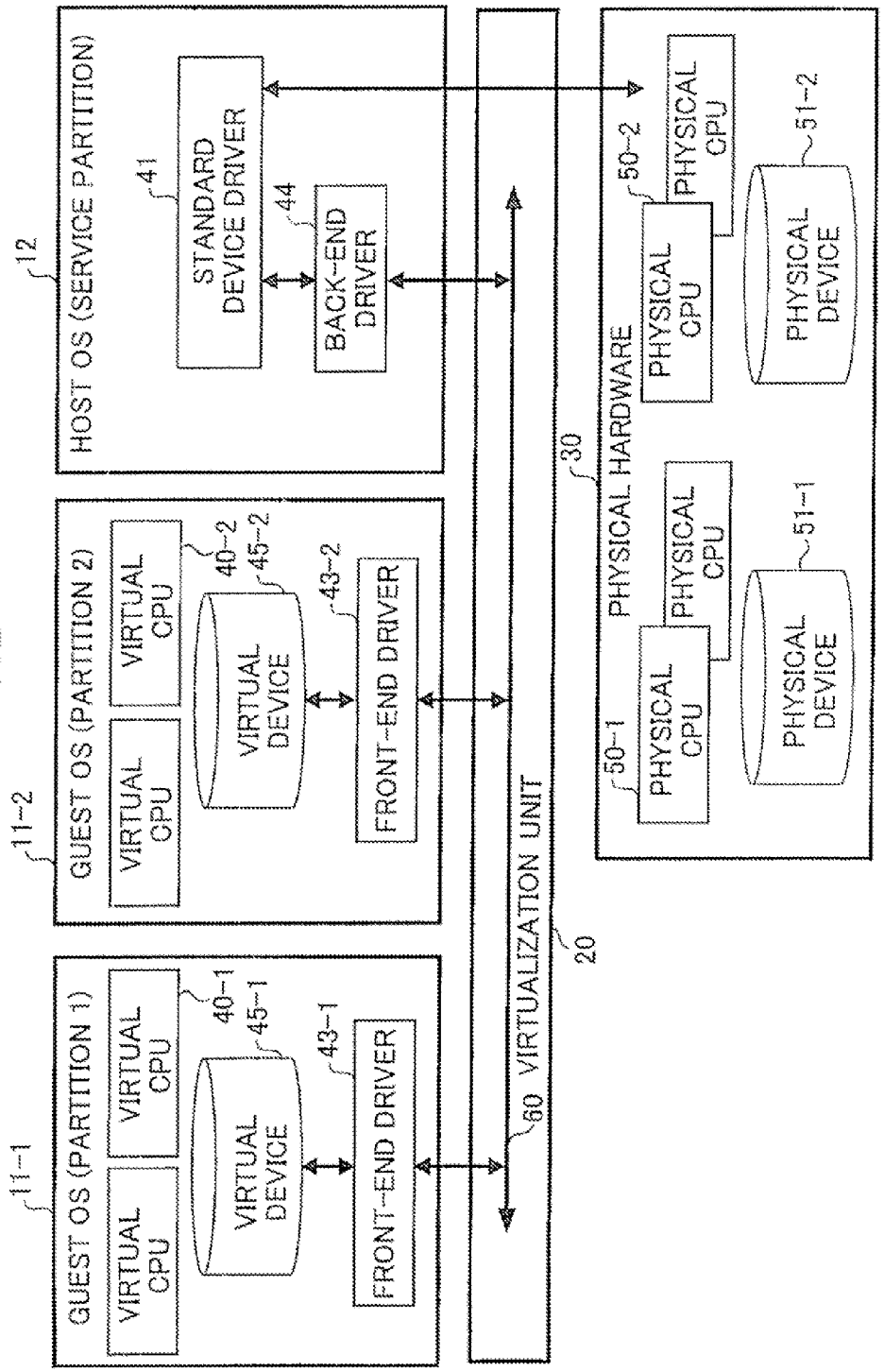
FIG. 2 A block diagram showing the configuration of a paravirtualization method.

FIG. 2 is a block diagram showing a paravirtualization architecture. Here, description will be given of a case where there are two guest OSes (Operating Systems) 11-1 and 11-2 and a host OS 12. For paravirtualization, device drivers dedicated to virtualization software are incorporated into the guest OSes 11-1 and 11-2. The drivers will be referred to as front-end drivers 43-1 and 43-2. I/O processing executed by the guest OSes 11-1 and 11-2 is notified from the respective front-end drivers 43-1 and 43-2 to a back-end driver 44 of the host OS 12 (also referred to as a service partition or administration domain) through an internal communication mechanism 60 of virtualization unit 20. Since all physical hardware 30 can be referred to from the host OS 12, the virtualization unit 20 converts the I/O processing requested by the guest OSes 11-1 and 11-2 into formats executable by a standard device driver 41 on the host OS 12, and accesses physical devices 51-1 and 51-2.

Under paravirtualization, the physical devices 51-1 and 51-2 are accessed by using the standard device driver 41 that is included in the host OS 12. The paravirtualization therefore has the advantage that the front-end drivers 43-1 and 43-2 and the back-end driver 44 need not be modified even when the hardware is updated for system replacement. However, there is in turn a problem of processing overhead because all the I/O processing executed by the guest OSes 11-1 and 11-2 concentrates on the host OS 12 through the internal communication mechanism 60 of the virtualization unit 20.

Figure 3:
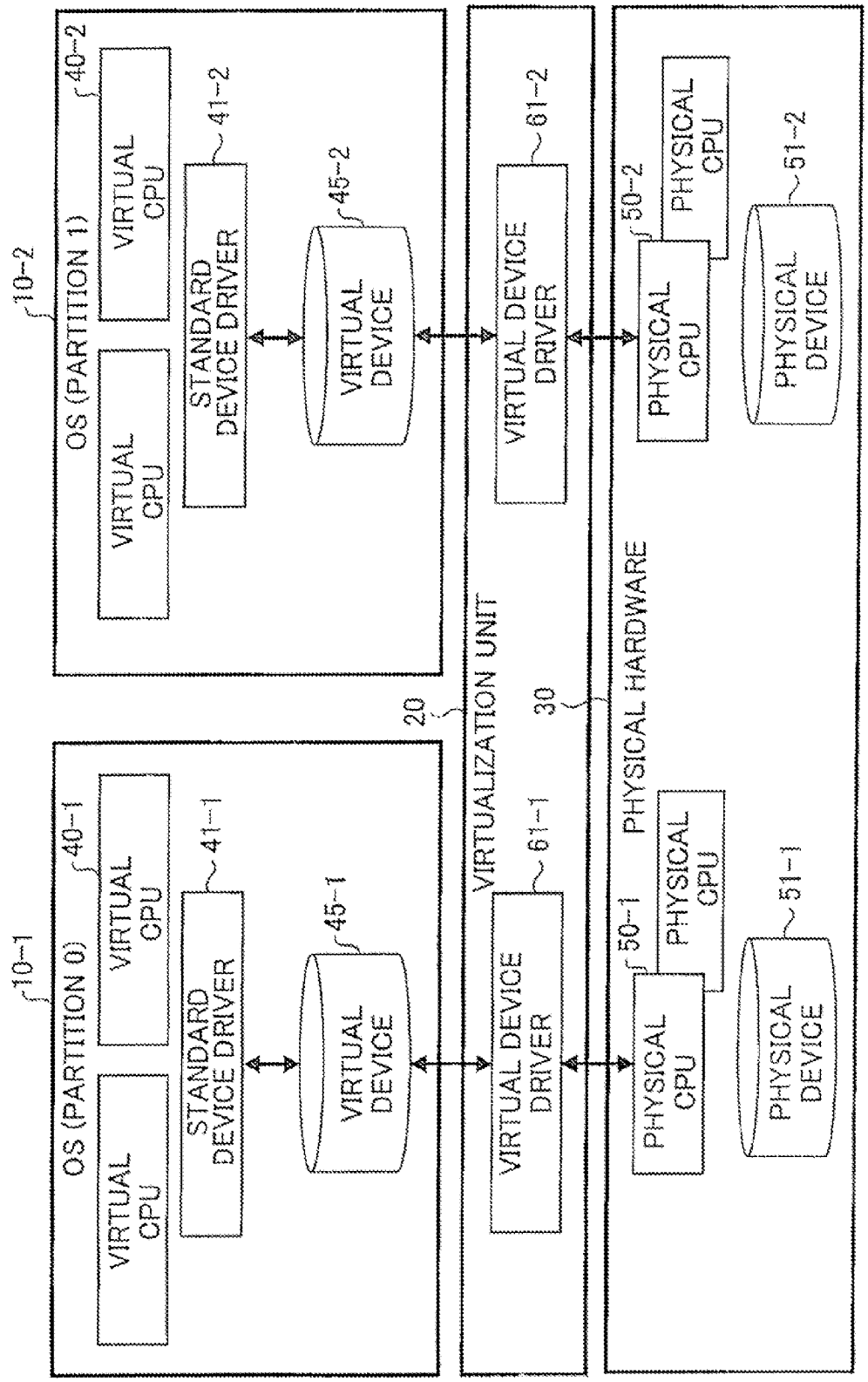
FIG. 3 A block diagram showing the configuration of a full virtualization method.

Full virtualization illustrated in FIG. 3 is an improved scheme in which the paravirtualization-based processing overhead and the service partition such as the host OS (Operating System) 12 are eliminated. For full virtualization, virtual device drivers 61-1 and 61-2 dedicated to virtualization software are installed under the OSes' standard device drivers 41-1 and 41-2, instead of the front-end drivers 43-1 and 43-2 of the paravirtualization scheme.

Depending on the position of installation, the virtualization device drivers 61-1 and 61-2 are broadly classified into a virtual device system and a direct allocation system. In the virtual device system, device drivers provided by the virtualization unit 20 are incorporated into the OSes 10-1 and 10-2. The I/O processing executed by the OSes 10-1 and 10-2 is notified to the virtualization unit 20 through the device drivers, and the virtualization unit 20 reproduces I/Os in appropriate forms. The direct allocation system is such that the device driver portions of the virtual device system are taken into the virtualization unit 20 so that virtualized hardware is directly visible to the OSes 10-1 and 10-2. The OSes 10-1 and 10-2 use the standard device drivers 41-1 and 41-2 to access the virtual device drivers 61-1 and 61-2 in the virtualization unit 20. FIG. 3 illustrates the direct allocation system.

The full virtualization does not use the internal communication mechanism 60 from the guest OSes 11-1 and 11-2 to the host OS 12, and reduces the virtualization-based processing overhead accordingly as compared to the paravirtualization. The full virtualization has the problem, however, that the virtual device drivers 61-1 and 61-2 corresponding to the OSes 10-1 and 10-2 need to be modified each time the hardware is changed, regardless of whether the virtual device system or direct allocation system.

The virtualization technologies need dedicated virtual device drivers for association between the physical device and the virtual device. One of the reasons is attributable to configuration processing according to the PCI device specifications which open OSes employ. Hereinafter, the configuration processing employed for open OSes will be described in conjunction with a PCI bus model shown in FIG. 4 as physical hardware.

Figure 4:
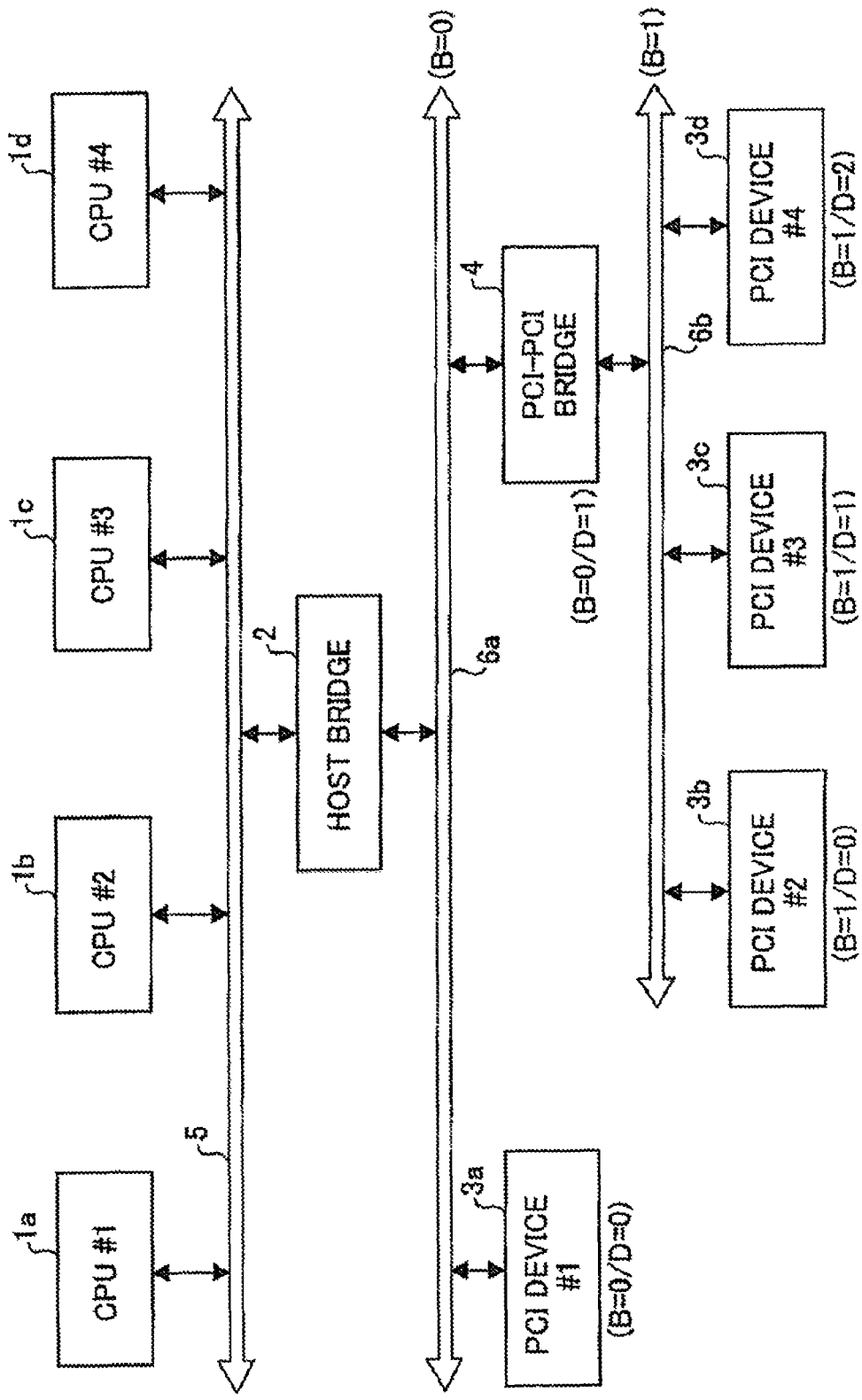
FIG. 4 A diagram showing a multiprocessor system in which a plurality of CPUs are connected to a host bus.

FIG. 4 shows a multiprocessor system in which CPUs 1a to 1d are connected to a host bus 5. The host bus 5 is connected to a host bridge 2 for accessing I/O devices. This model includes two PCI buses 6a and 6b. The PCI bus 6a has bus number 0 (B=0), and the PCI bus 6b has bus number 1 (B=1). The PCI buses 6a and 6b are connected to each other by a PCI-PCI bridge 4. A PCI device 3a is connected to the PCI bus 6a. Three PCI devices 3b to 3d are connected to the PCI bus 6b.

Bus numbers and device numbers are assigned to the PCI devices by the OSes' configuration processing at system startup or at hotplug time.

The configuration processing assigns bus numbers by the following procedure:
(1) Processing P1
Assign bus number 0 to the secondary bus of the host bridge and store the bus number. Check the secondary bus of the host bridge and confirm existence of PCI-PCI bridges.
(2) Processing P2
Add one to the stored bus number and assign the resulting bus number to the secondary bus of a PCI-PCI bridge found. Store the resulting bus number.

(3) Processing P3

Check the secondary bus of the PCI-PCI bridge found by the processing P2 of the above paragraph (2) and to confirm whether there is additionally a PCI-PCI bridge under the PCI-PCI bridge. If a new PCI-CPI bridge is found, perform the foregoing processing P2.

(4) Processing P4

If a new PCI-PCI bridge is no longer found under the PCI-PCI bridge, perform the foregoing processing P2 on the next PCI-PCI bridge that is connected to the host bridge.

The configuration processing assigns devices numbers by the following procedure:

(1) Processing P11

Before checking the secondary bus of the host bridge or a PCI-PCI bridge, initialize device number to 0. Store the device number.

(2) Processing P12

Check for a PCI device or PCI-PCI bridge connected to the bus. Assign the stored device number to the PCI device or PCI-PCI bridge found. Add one to the device number, and store the resultant.

(3) Processing P13

Repeat the foregoing processing P12 each time a PCI device or PCI-PCI bridge connected to the bus is found.

(4) Processing P14

If a new PCI device or PCI-PCI bridge is no longer found under the bus, perform the foregoing processing P11 on the secondary bus of a next PCI-PCI bridge.

The parenthetic numerals in FIG. 4 indicate the primary bus numbers (B) and device numbers (D) of the PCI devices and PCI-PCI bridge which are assigned according to the procedures.

Figure 5:
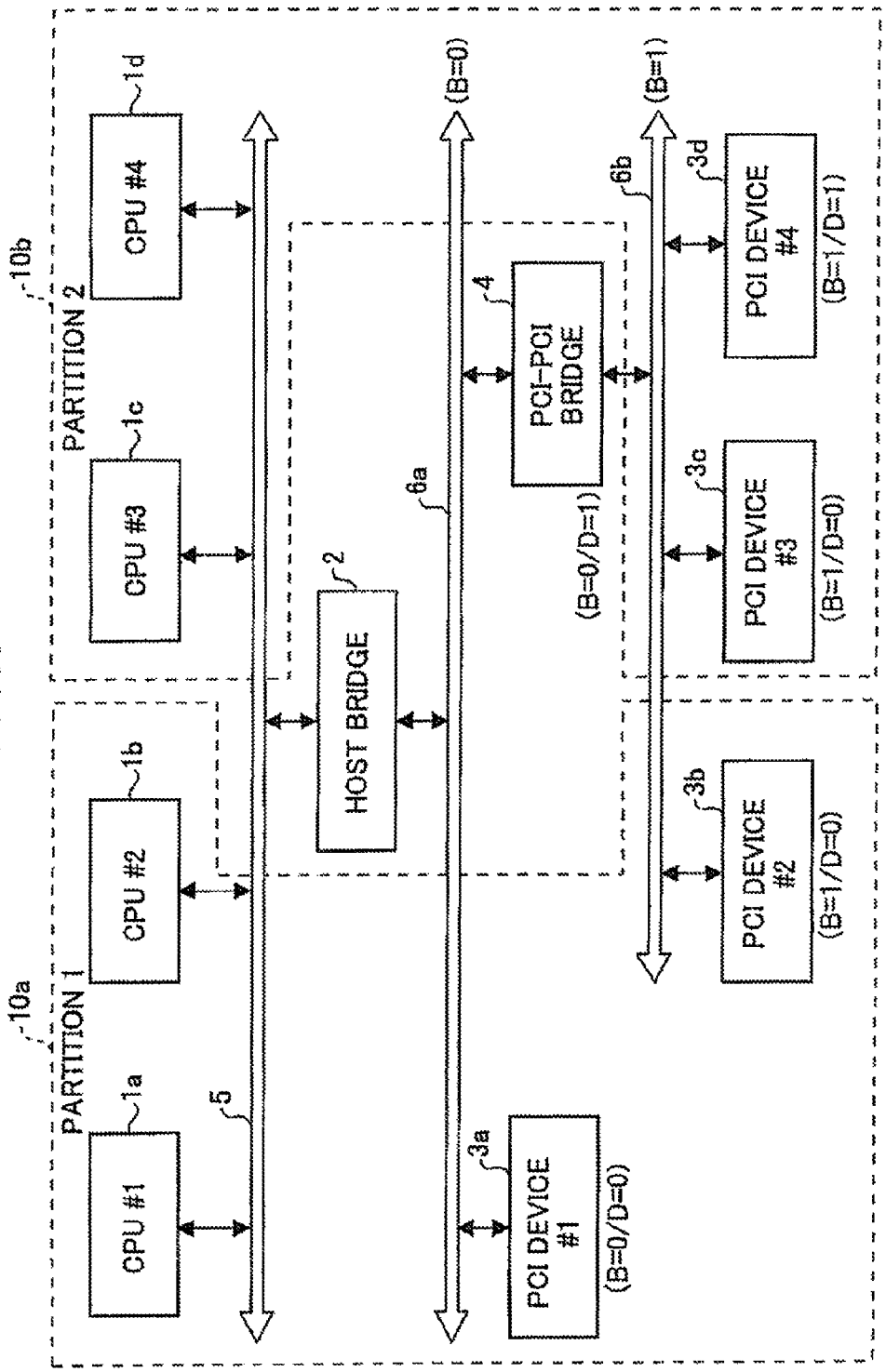
FIG. 5 A diagram showing a case where the system of the PCI bus model is divided into two partitions by virtualization.

Now, suppose that the system of this PCI bus model is divided into two partitions by virtualization. FIG. 5 shows the configuration where the PCI devices 3a and 3b are allocated to partition 1 and the PCI devices 3c and 3d are allocated to partition 2.

In response to configuration processing from OSes, the virtualization unit shows devices not belonging to the OSes' own partitions as if not mounted, and makes the OSes perform the assignment.

The parenthetic numerals in the PCI bus model of FIG. 5 indicate the bus numbers and device numbers that are assigned by the two partitioned OSes 10a and 10b according to the foregoing configuration processing.

In FIG. 5, the PCI device 3b which belongs to partition 1 and the PCI device 3c which belong to partition 2 have the same bus number 1/device number 0 (B=1/D=0). A bus conflict can thus occur if the bus numbers/device numbers are assigned to the physical devices.

In such a case, to avoid the bus conflict between the bus numbers/device numbers, the virtualization unit needs to change the bus numbers/device numbers between the virtual devices and physical devices.

Figure 6:
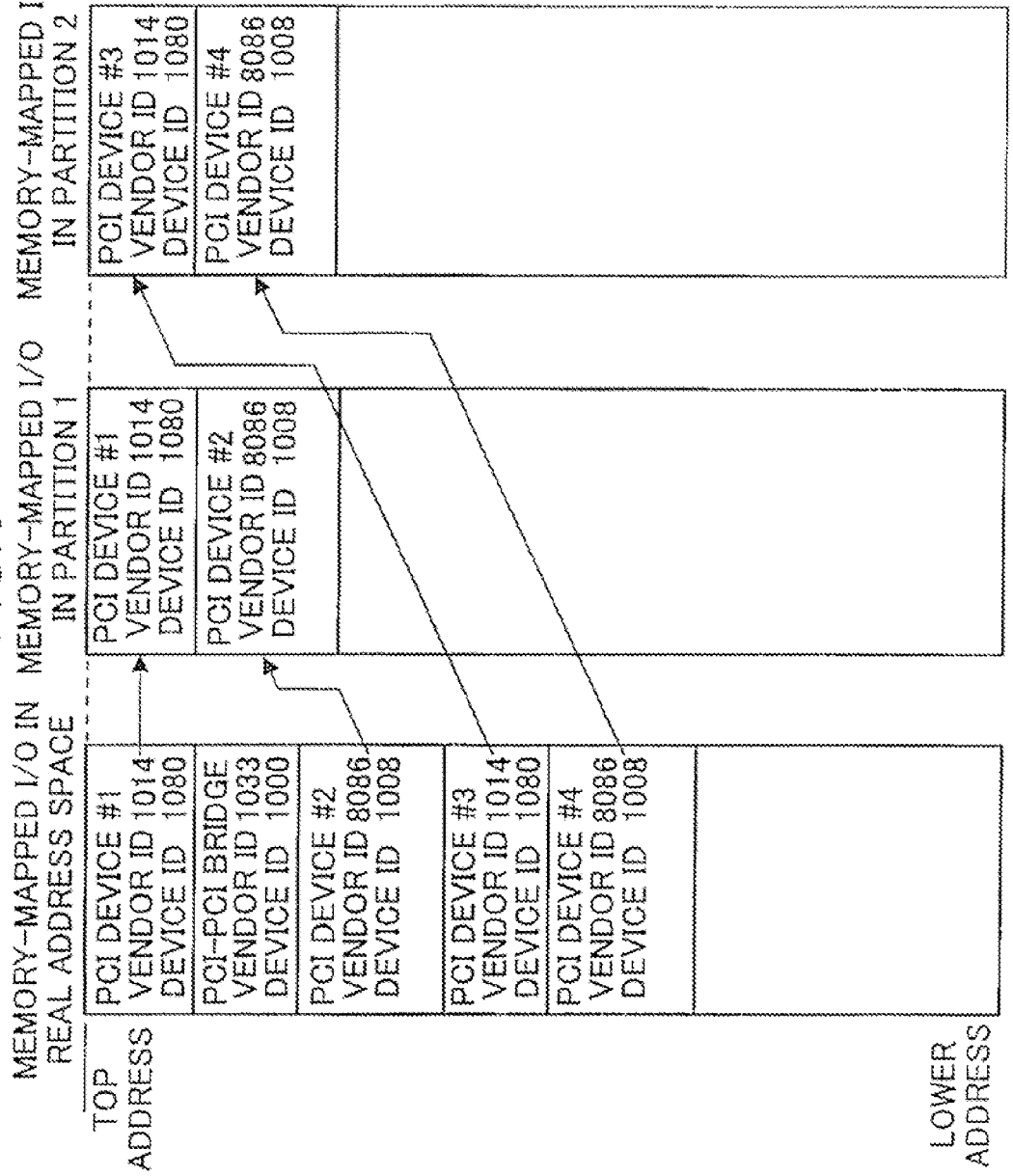
FIG. 6 A diagram showing the register allocation of memory-mapped I/O in a real address space and the register allocation of memory-mapped I/O in virtualized partitions 1 and 2 when configuration processing is performed in a non-virtualized system.

Referring to FIG. 6, description will now be given of the register allocation of memory-mapped I/O in the real address space and the register allocation of memory-mapped 110 in virtualized partitions 1 and 2 when the configuration processing is performed by a non-virtualized system.

When PCI devices detected by the foregoing configuration processing require register areas, open OSes operate to arrange the registers of the detected PCI devices in succession from the top address of their memory-mapped I/O space.

If OSes in virtualized partitions perform the configuration processing by the same procedures, the devices not belonging to their own partitions are hidden and made undetectable by the virtualization software. Such devices therefore will not be mapped on the virtual memory-mapped I/O of the OSes' own partitions, which causes a difference in address allocation between the virtual memory-mapped I/O and the real memory-mapped I/O. Consequently, the I/O registers cause an address conflict when the PCI devices are accessed with no distinction between the virtual memory-mapped I/O and the real memory-mapped I/O.

To avoid the address conflict between the I/O registers of the PCI devices caused by virtualization, it has been needed for the virtualization unit to perform address translation between the virtual memory-mapped I/O and the real memory-mapped I/O.

Not all device drivers included with guest OSes and PCI devices support virtual memory-mapped I/O. For such cases, it has been needed to install device drivers dedicated to the virtualization software under the OSes.

Now, the present embodiment will be described.

Figure 1:
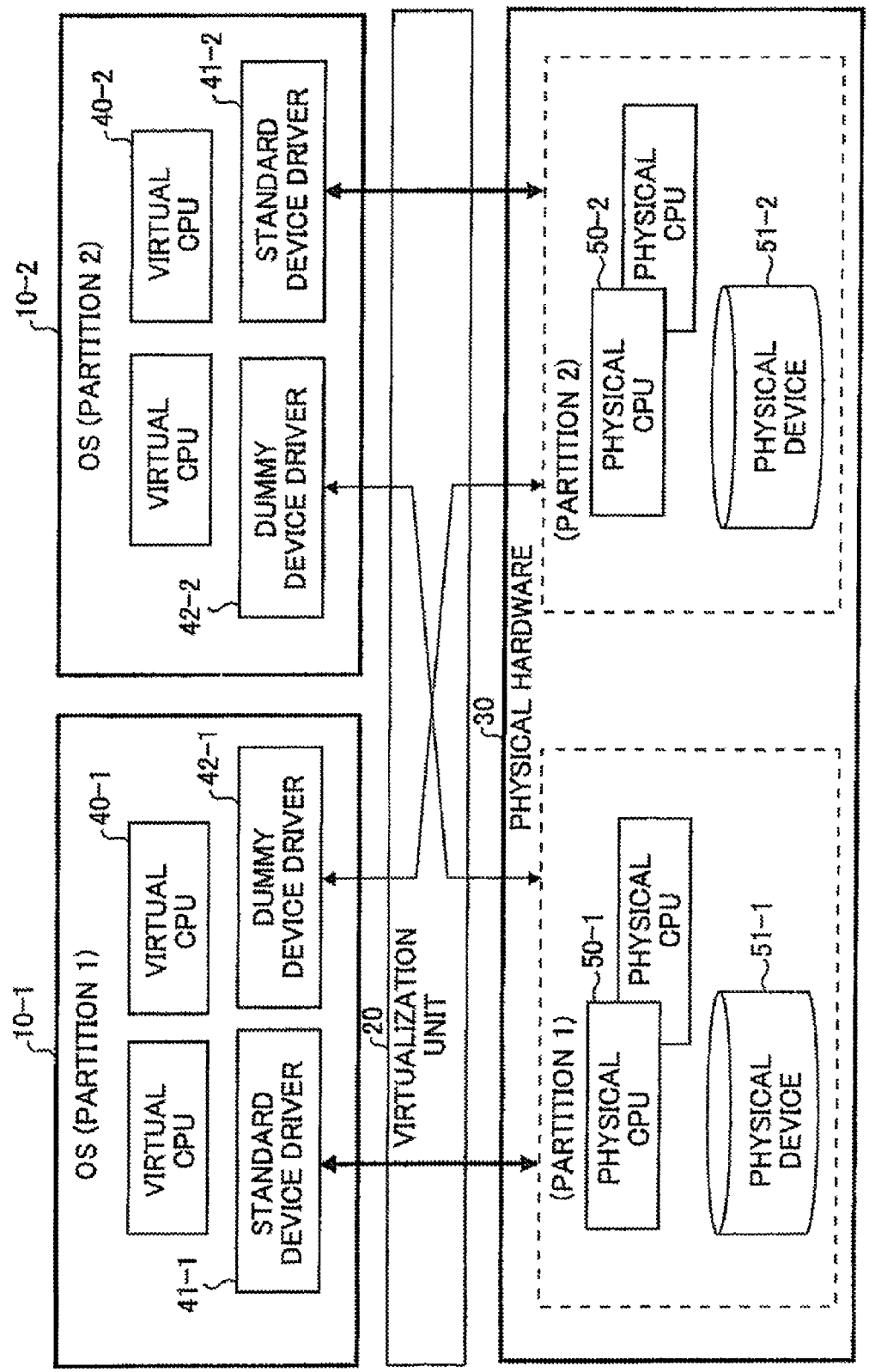
FIG. 1 A block diagram of a computer system according to an embodiment of the present invention.

FIG. 1 is a block diagram of a computer system according to the embodiment of the present invention.

The system of the embodiment of FIG. 1 is configured so that physical hardware 30 is divided into two virtual systems or partitions 1 and 2 in units of physical devices 51-1 and 51-2.

The physical device 51-1 of partition 1 is put under the control of an OS (Operating System) that runs on physical CPUs 50-1 belonging to partition 1. The physical device 51-1 is accessed by using a standard device driver 41-1 that is included in an OS 10-1 of partition 1.

Similarly, the physical device 51-2 of partition 2 is put under the control of an OS that runs on physical CPUs 50-2 belonging to partition 2. The physical device 51-2 is accessed by using a standard device driver 41-2 that is included in an OS 10-2 of partition 2.

Virtualization unit 20 has the function of capturing configuration accesses from virtual CPUs 40-1 and 40-2 corresponding to the physical CPUs 50-1 and 50-2, and when, for example, the virtual CPUs 40-1 access the physical device 51-2 which does not belong to their own partition, replacing the vendor ID and device ID of the physical device 51-2 with the IDs of a nonexistent dummy device and notifying the resultant to the virtual CPUs 40-1. The virtualization unit may be virtualization software.

Dummy device drivers 42-1 and 42-2 are device drivers corresponding to a dummy device, and have the function of making the OSes recognize physical devices not belonging to their own partitions as named valid devices. For example, the dummy device driver 42-1 makes the OS 10-1 recognize the physical device 51-2, which does not belong to partition 1, as a named valid device. The dummy device drivers 42-1 and 42-2 also have the function of rejecting execution of processing that disturbs the operation of the PCI device belonging to another partition, from the execution of processing common to all PCI devices that is requested by the OSes 10-1 and 10-2.

In the configuration of the present embodiment, the virtual CPUs 40-1 and 40-2 are defined as means for virtualizing the physical CPUs 50-1 and 50-2. Description of the technology for CPU virtualization will be omitted here.

The association between the physical devices 51-1 and 51-2 and the respective partitions is established by a device control table shown in FIG. 7. The device control table is to be determined in advance when constructing a virtual system, and is retained in the virtualization unit 20.

The device control table defines PCI devices belonging to which partitions the physical devices 51-1 and 51-2 are, with the bus numbers, device numbers, and function numbers of the physical devices 51-1 and 51-2 as inputs.

For ease of explanation, the device control table in the present embodiment shall contain the vendor IDs/device IDs of the real devices corresponding to the physical devices 51-1 and 51-2 and the vendor IDs/device IDs of the dummy devices corresponding to the physical devices 51-1 and 51-2. Note that the vendor IDs/device IDs of the real devices can be read from the configuration registers of the physical devices 51-1 and 51-2, and the vendor IDs/device IDs of the dummy devices may be substituted by fixed values. Such pieces of information are therefore not indispensable components.

The operation of the present embodiment will be described with reference to FIGS. 1, 4, and 7 to 9.

Figure 8:
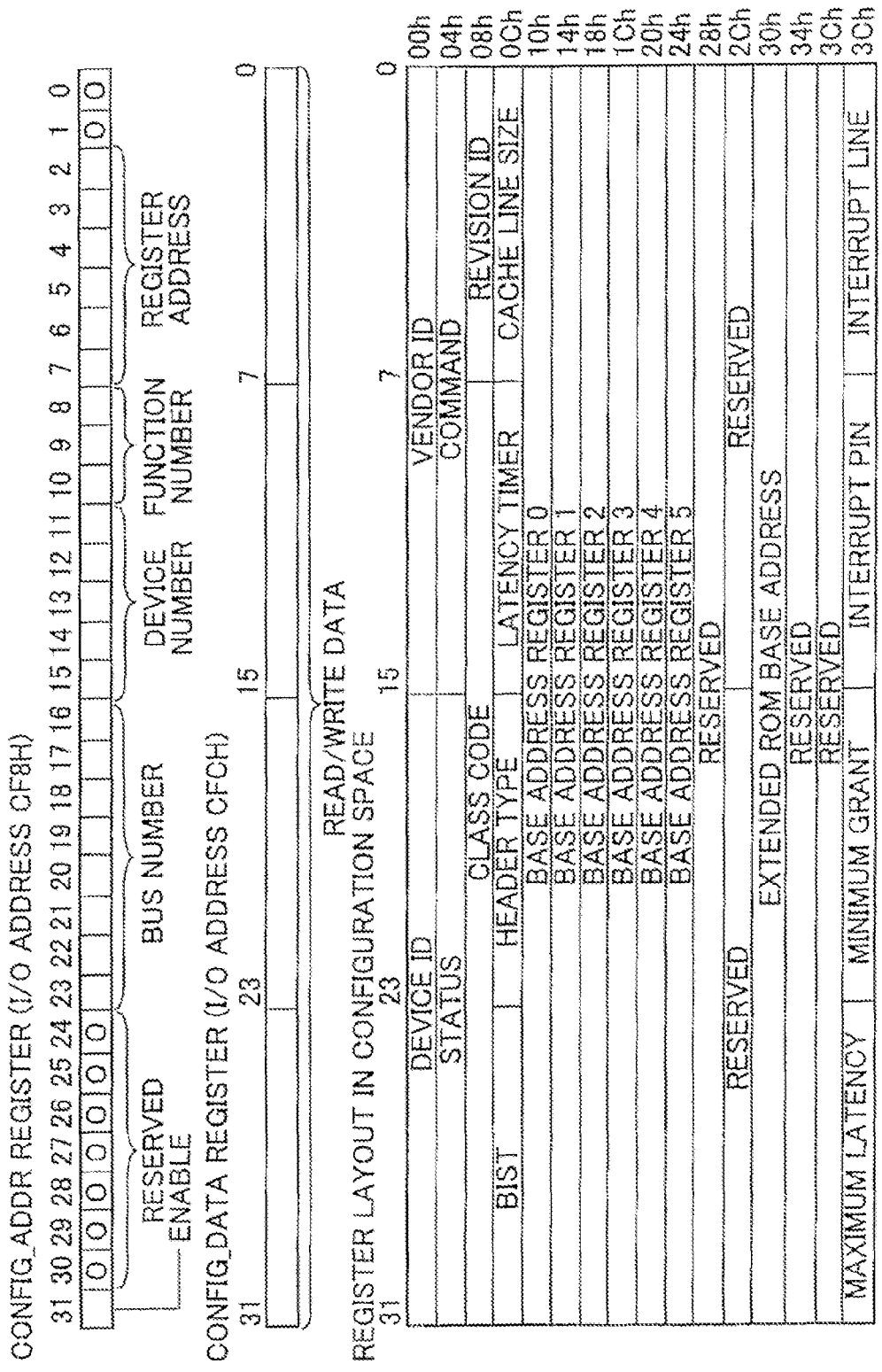
FIG. 8 A diagram showing the mechanism of generation of configuration cycles defined in PCI specification 2.0.

FIG. 8 is a diagram showing the mechanism of generation of configuration cycles defined in PCI specification 2.0. In AT compatible systems, the host bridge 2 has built-in I/O ports for accessing the configuration registers of the PCI devices 3*a* to 3*d* and the PCI-PCI bridge 4. The host bridge 2 has a configuration cycle generation circuit which includes a 4-byte-wide register called CONFIG_ADDR register. An I/O read or write to I/O address CF8h, when performed by the CPUs 1*a* to 1*d*, will be handled as a read/write to the CONFIG_ADDR register. The CONFIG_ADDR register is intended to indicate the bus number of the PCI bus, the device number, the function number, and the register address of the PCI device, for the host bridge 2 to access. The CONFIG_ADDR register retains the last values written thereto.

The host bridge 2 includes another 4-byte-wide register called CONFIG_DATA register. When an I/O read or write to within four bytes of I/O addresses from CFCh to CFFh is performed by the CPUs 1*a* to 1*d*, the CONFIG_DATA register handles the I/O read or write as a read or write to the CONFIG_DATA register, and generates a configuration cycle for the PCI device that is specified by the CONFIG_ADDR register.

The virtualization unit 20 of the present embodiment captures an access from the virtual CPUs 40-1 and 40-2 of FIG. 1 to the CONFIG_DATA register, and determines the configuration register of which physical device the OSes 10-1 and 10-2 of the respective partitions are accessing from the value of the CONFIG_DATA register.

The virtualization unit 20 then searches the device control table shown in FIG. 7 to determine which partition the physical device belongs to.

If a virtual CPU issues a configuration access to a physical device that belongs to its own partition, the virtualization unit 20 simply executes the configuration access issued by the virtual CPU. For example, when a virtual CPU 40-1 issues a configuration access to the physical device 51-1 which belongs to its own partition, the virtualization unit 20 simply executes the configuration access issued by the virtual CPU 40-1.

If a virtual CPU issues a configuration access to a physical device that does not belong to its own partition, the virtualization unit 20 determines the register address of the physical device to be accessed, from the content of the CONFIG_ADDR register. If the access is a read request for the vendor ID or device ID, the virtualization unit 20 replaces the IDs with the vendor ID and device ID of a nonexistent dummy device and notifies the read data to the virtual CPU. For example, if a virtual CPU 40-1 issues a configuration access to the physical device 51-2 which does not belong to its own partition, the virtualization unit 20 determines the register address of the physical device 51-2 to be accessed, from the content of the CONFIG_ADDR register. If the access is a read request for the vendor ID or device ID, the virtualization unit 20 replaces the IDs with the vendor ID and device ID of a nonexistent dummy device and notifies the read data to the virtual CPU 40-1.

In the present embodiment, the vendor ID for dummy devices to use is defined as 5853*h*, and the device IDs for dummy devices to use are defined as 9999*h* (for PCI devices) and 8888*h* (for PCI-PCI bridges).

FIG. 7 shows the vendor IDs and device IDs of all the PCI devices 3*a* to 3*d* and the PCI-PCI bridge 4 in the PCI bus model shown in FIG. 4, both as real devices and as dummy devices.

With the mechanism described above, the OSes 10-1 and 10-2 running on the virtualization unit 20 of the present embodiment recognize the physical devices 51-2 and 51-1 not belonging to their respective partitions as being physically/logically mounted, but handle the devices as unknown unusable devices (dummy devices).

Consequently, when the configuration processing is performed upon activation of the OSes 10-1 and 10-2, the OSes of both partitions can refer to the same PCI bus configuration. The bus numbers/device numbers shown in FIG. 4 are therefore assigned to the physical devices 51-1 and 51-2 as with no virtualization.

Figure 9:
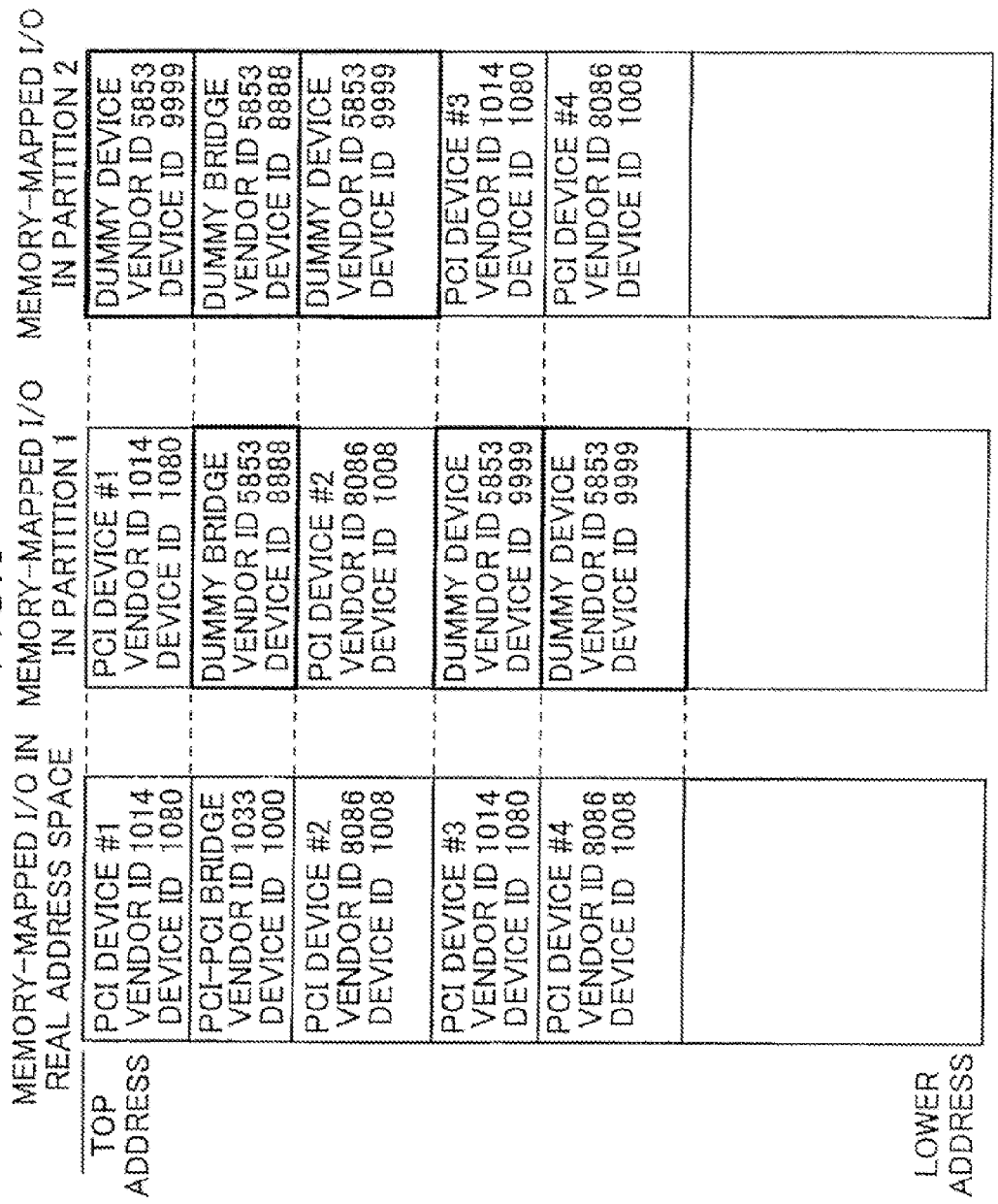
FIG. 9 A diagram showing the result of configuration of the memory-mapped I/O spaces in real addresses, partition 1, and partition 2 allocated.

FIG. 9 shows the result of configuration of the memory-mapped I/O spaces in real addresses, partition 1, and partition 2 allocated.

In FIGS. 7 and 9, the PCI device #1 has a vendor ID: 1014*h* and a device ID: 1080*h*. Since the device belongs to partition 1, a PCI device having the same vendor ID and device ID as those of the real device is allocated to the same position in the memory-mapped I/O of partition 1 as in the real address space.

From partition 2, the PCI device #1 is recognized as a nonexistent unknown device (dummy device) with a vendor ID: 5853*h* and a device ID: 9999*h*. Since the dummy device has the same base address register size as that of the PCI device #1, it is allocated as a dummy device having the same I/O register size as that of the PCI device #1, at the same position in the memory-mapped I/O as in the real address space.

The PCI devices #2 to #4 are also allocated to the memory-mapped I/O by the same procedure.

In the present embodiment, the PCI-PCI bridge is defined as a common device not belonging to any partition. In the device management table shown in FIG. 7, partition number 0 is given to such a device. The OSes of partitions 1 and 2 thus recognize the PCI-PCI bridge as a dummy bridge with a vendor ID: 5853*h* and a device ID: 8888*h*.

Referring to the device allocation in the memory-mapped I/O spaces of FIG. 9, it can be seen that the PCI devices belonging to the partitions 1 and 2 are allocated to exactly the same addresses in the respective own partitions as in the memory-mapped I/O of the real address space.

It is also shown that the PCI devices and the PCI-PCI bridge not belonging to the own partitions are allocated as dummy devices and a dummy bridge, respectively.

With such a mechanism, the OSes can control the PCI devices belonging to their own partitions by using their standard device drivers.

Aside from the configuration register layout (type 00*h*) for PCI devices shown in FIG. 8, the PCI specification also includes a register layout (type 01*h*) for PCI-PCI bridges and register layouts compatible to subsequent PCI specifications. Examples include a subsystem vendor ID/subsystem ID analogous to the vendor ID/device ID and an extended ROM base address register analogous to the base address register. The present invention provides the same effects for such examples, and description thereof will thus be omitted in the present embodiment.

Next, the function of the dummy device drivers (or dummy bridge drivers) shown in FIG. 1 will be described.

When an OS refers to a PCI device not belonging to its own partition by using the virtualization software, the PCI device is recognized by the OS as an unknown device. The OS therefore will not use the functions of the PCI device not belonging to its own partition.

The OS, however, may perform OS operations common to all PCI devices. Such processing, when performed on PCI devices belonging to other partitions, can affect the system operation of the other partitions. One such example is to check device detachability which is performed before hot-plugging a PCI device.

To avoid OS operations common to all PCI devices, the device drivers of the present embodiment play the function of making the OSes recognize PCI devices not belonging to their own partitions as named valid devices, and if an OS operation that may affect the system operation of the other partitions is requested of the dummy device drivers, rejecting the execution of such an operation.

Figure 10:
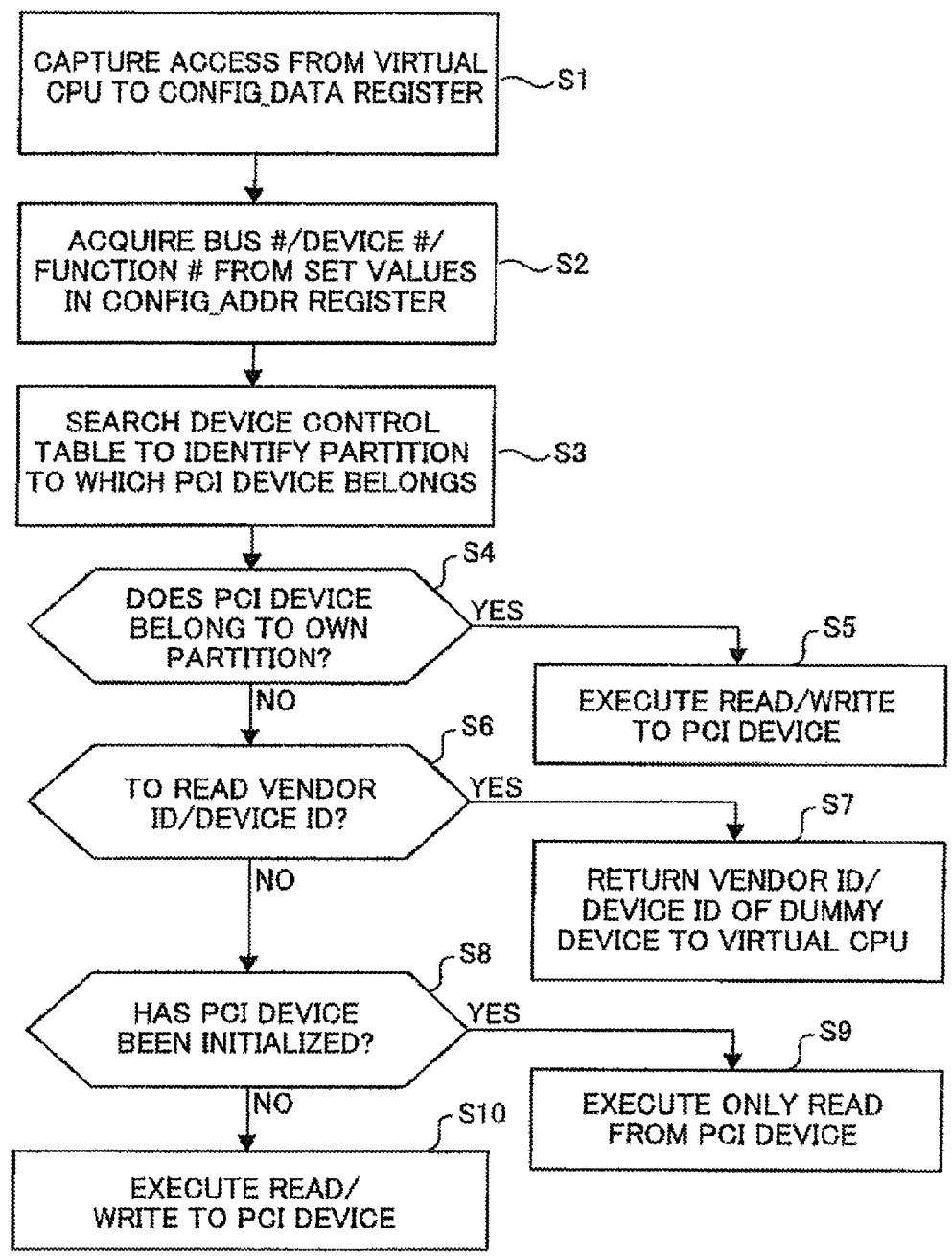
FIG. 10 A flowchart showing the processing flow of virtualization unit according to the present embodiment.

FIG. 10 shows the processing flow of the virtualization software according to the present embodiment.

At step S1, the virtualization software captures an access from a virtual CPU to the CONFIG_DATA register. At step S2, the virtualization software acquires the bus number, device number, and function number of the PCI device to be accessed from the set values in the CONFIG_ADDR register. Based on the information, at step S3, the virtualization software searches the device control table to identify the partition number to which the PCI device belongs.

At step S4, if the PCI device belongs to the own partition, the register read or register write from the virtual CPU to the PCI device is simply executed at step S5. If at step S4 the PCI device does not belong to the own partition, the virtualization software identifies, at step S6, the address of the accessed configuration register from the set values in the CONFIG_ADDR register and determines whether the access is a read for the vendor ID or device ID. If so, the virtualization software returns the vendor ID/device ID of the dummy device set in the device control table, to the virtual CPU at step S7.

If at step S6 the access is other than a read for the vendor ID or device ID to the configuration register, the virtualization software determines at step S8 whether the PCI device was already initialized at system startup or at hotplug time. If initialized, only a read to the configuration register from the virtual CPU is executed at step S9 so as not to disturb the operation of the PCI device. If not, a read or write to the configuration register of the PCI device is executed at step S10.

Note that steps S8, S9, and S10 involve respective different register access controls, depending on the type of the configuration register. However, the present embodiment only illustrates a simplified flow.

According to the present embodiment described so far, the configuration processing on PCI devices by the server virtualization (virtual machine) technology includes replacing the vendor IDs and device IDs of PCI devices with the IDs of nonexistent dummy devices and notifying the resultant to OSes when the OSes make a configuration access to the PCI devices that do not belong to their own partitions. This hides the types of the physical devices not belonging to their own partitions from the OSes, and makes the OSes perform configuration as if the dummy devices are mounted. In consequence, there is provided the function of matching the register allocation of the PCI devices in the virtual mapped I/O spaces with that in the real mapped I/O space.

Although the exemplary embodiments of the present invention have been described in detail, it should be understood that the present invention can be practiced in various forms without departing from the sprit and scope of the invention as defined by the appended claims. Thus, the above embodiments are merely illustrative and should not be considered restrictive in any way. The scope of the present invention is defined by the appended claims and not restricted by the descriptions of the specification and abstract. Further, all variations and modifications which come within the equivalent range of the claims are embraced in the scope of the present invention.

The whole or part of the exemplary embodiments disclosed above can be described as, but not limited to, the following supplement notes.

(Supplementary note 1) A computer system comprising:
  a plurality of physical devises belonging to a plurality of partitions divided by virtualization;
  a plurality of physical CPUs belonging to the plurality of partitions;
  a plurality of standard devise drivers belonging to the plurality of partitions, the plurality of standard devise drivers being used for accessing the plurality of physical devises;
  a plurality of dummy device drivers belonging to the plurality of partitions, the plurality of dummy devise drivers being corresponding to a plurality of nonexistent dummy devices;
  a plurality of virtual CPUs belonging to the plurality of partitions; and
  a virtualization unit for capturing a configuration access to the physical device from the virtual CPU and identifying a partition to which the physical device belongs from a device address of the physical device accessed by the virtual CPU,
  wherein if the accessed physical device belongs to the virtual CPU system's partition, the virtualization unit executes a configuration register read or write to the physical device requested by the virtual CPU, and if the accessed physical device does not belong to the virtual CPU's partition, the virtualization unit replaces a content of a configuration register that identifies the physical device with information on a nonexistent dummy device and notifying the resultant to the virtual CPU, and
  wherein the virtual CPU recognizes the physical device not belonging to its own partition as a named valid device by using the dummy device driver, and
  the dummy device driver rejects execution of processing that disturbs operation of a physical device belonging to another partition, from execution of processing common to all physical devices that is requested by the virtual CPU.

(Supplementary note 2) The computer system according to Supplementary note 1, wherein if the accessed physical device does not belong to the virtual CPU's partition, the virtualization unit replaces a content of the configuration register that identifies a manufacturer and type of the physical device with a manufacturer or type of the nonexistent dummy device and notifies the resultant to the virtual CPU.

(Supplementary note 3) A method of configuration processing of a physical device on a virtualization apparatus, the method comprising:
  capturing a configuration access to a physical device from a virtual CPU;

identifying a partition to which the physical device belongs, from a device address of the physical device accessed by the virtual CPU;

if the accessed physical device belongs to the virtual CPU's partition, executing a configuration register read or write to the physical device requested by the virtual CPU, and if the accessed physical device does not belong to the virtual CPU's partition, replacing a content of a configuration register that identifies the physical device with information on a nonexistent dummy device and notifying the resultant to the virtual CPU;

making the virtual CPU recognize the physical device not belonging to its own partition as a named valid device by using a dummy device driver corresponding to the dummy device; and rejecting, by using the dummy device driver, execution of processing that disturbs operation of a physical device belonging to another partition, from execution of processing common to all physical devices that is requested by the virtual CPU.

(Supplementary note 4) The method of configuration processing according to Supplementary note 3, wherein if the accessed physical device does not belong to the virtual CPU's partition, a content of the configuration register that identifies a manufacturer and type of the physical device is replaced with a manufacturer or type of a nonexistent dummy device, and the resultant is notified to the virtual CPU.

(Supplementary note 5) A computer system comprising:
an operating system; and
virtualization unit for capturing a configuration access to a PCI device from the operating system and identifying a partition to which the PCI device belongs from a device address of the PCI device accessed by the operating system,
wherein if the PCI device belongs to the operating system's own partition, the virtualization unit executes a configuration register read or write to the PCI device requested by the operating system, and if the PCI device does not belong to the operating system's own partition, the virtualization unit replaces a content of a configuration register that identifies the PCI device with information on a nonexistent dummy device and notifying the resultant to the operating system, and
wherein the operating system comprises a dummy device driver corresponding to the dummy device, and recognizes the PCI device not belonging to its own partition as a named valid device by using the dummy device driver, and
the dummy device driver rejects execution of processing that disturbs operation of a PCI device belonging to another partition, from execution of processing common to all PCI devices that is requested by the operating system.

(Supplementary note 6) The computer system according to Supplementary note 5, wherein if the PCI device does not belong to the operating system's own partition, the virtualization unit replaces a content of the configuration register that identifies a manufacturer and type of the PCI device with a manufacturer or type of the nonexistent dummy device and notifies the resultant to the operating system.

(Supplementary note 7) A method of configuration processing of a PCI device on a virtualization apparatus, the method comprising:
capturing a configuration access to a PCI device from an operating system running on virtualization software;
identifying a partition to which the PCI device belongs, from a device address of the PCI device accessed by the operating system;
if the PCI device belongs to the operating system's own partition, executing a configuration register read or write to the PCI device requested by the operating system, and if the PCI device does not belong to the operating system's own partition, replacing a content of a configuration register that identifies the PCI device with information on a nonexistent dummy device and notifying the resultant to the operating system;
making the operating system recognize the PCI device not belonging to its own partition as a named valid device by using a dummy device driver corresponding to the dummy device; and
rejecting, by using the dummy device driver, execution of processing that disturbs operation of a PCI device belonging to another partition, from execution of processing common to all PCI devices that is requested by the operating system.

(Supplementary note 8) The method of configuration processing according to Supplementary note 7, wherein if the PCI device does not belong to the operating system's own partition, a content of the configuration register that identifies a manufacturer and type of the PCI device is replaced with a manufacturer or type of a nonexistent dummy device, and the resultant is notified to the operating system.

INDUSTRIAL APPLICABILITY

The present invention is applied to a computer system that includes PCI devices.

REFERENCE SIGNS LIST

10-1, 10-2: OS
20: virtualization unit
30: physical hardware
41-1, 41-2: standard device driver
42-1, 42-2: dummy device driver
50-1, 50-2: physical CPU
51-1, 51-2: physical device

The invention claimed is:

1. A computer system comprising:
a first physical device, a first physical Central Processing Unit (CPU), a first standard device driver, a first dummy device driver, and a first virtual Central Processing Unit (CPU) which belong to a first partition, the first standard device driver being used for accessing the first physical device, the first dummy device driver corresponding to a nonexistent dummy device;
a second physical device, a second physical CPU, a second standard device driver, a second dummy device driver, and a second virtual CPU which belong to a second partition, the second standard device driver being used for accessing the second physical device, the second dummy device driver corresponding to a nonexistent dummy device; and
a virtualization unit for capturing a configuration access to a physical device from the first virtual CPU, identifying a partition to which the physical device belongs from a device address of the physical device accessed by the first virtual CPU, and determining whether the accessed physical device corresponds to the first physical device or not,
wherein if the accessed physical device corresponds to the first physical device, the virtualization unit executes a configuration register read or write to the first physical device, and if the accessed physical device corresponds to the second physical device, the virtualization unit replaces a content of a configuration register that identifies the second physical device with information on a nonexistent dummy device and notifies a resultant to the first virtual CPU, and wherein the first virtual CPU recognizes the second physical device as a named valid device by using the first dummy device driver, and the first dummy device driver rejects execution of processing that disturbs operation of a physical device not belonging to the first partition, from execution of processing common to all physical devices that is requested by the first virtual CPU.

2. The computer system according to claim 1, wherein if the accessed physical device corresponds to the second physical device, the virtualization unit replaces a content of the configuration register that identifies a manufacturer and type of the second physical device with a manufacturer or type of the nonexistent dummy device and notifies the resultant to the first virtual CPU.

3. A method of configuration processing of a physical device on a computer system, the computer system comprising:

a first physical device, a first physical Central Processing Unit (CPU), a first standard device driver, a first dummy device driver, and a first virtual Central Processing Unit (CPU) which belong to a first partition, the first standard device driver being used for accessing the first physical device, the first dummy device driver corresponding to a nonexistent dummy device; and a second physical device, a second physical CPU, a second standard device driver, a second dummy device driver, and a second virtual CPU which belong to a second partition, the second standard device driver being used for accessing the second physical device, the second dummy device driver corresponding to a nonexistent dummy device, the method comprising:

capturing a configuration access to a physical device from the first virtual CPU;

identifying a partition to which the physical device belongs, from a device address of the physical device accessed by the first virtual CPU;

determining whether the accessed physical device corresponds to the first physical device or not;

if the accessed physical device corresponds to the first physical device, executing a configuration register read or write to the first physical device, and if the accessed physical device corresponds to the second physical device, replacing a content of a configuration register that identifies the second physical device with information on a nonexistent dummy device and notifying a resultant to the first virtual CPU;

making the first virtual CPU recognize the second physical device as a named valid device by using the first dummy device driver; and rejecting, by using the first dummy device driver, execution of processing that disturbs operation of a physical device not belonging to the first partition, from execution of processing common to all physical devices that is requested by the first virtual CPU.

4. The method of configuration processing according to claim 3, wherein if the accessed physical device corresponds to the second physical device, a content of the configuration register that identifies a manufacturer and type of the second physical device is replaced with a manufacturer or type of a nonexistent dummy device, and the resultant is notified to the first virtual CPU.

* * * * *